(12) United States Patent
Fuks et al.

(10) Patent No.: US 7,125,045 B2
(45) Date of Patent: Oct. 24, 2006

(54) ACTIVE KNEE BOLSTER WITH ADAPTIVE FORCE RESPONSE SYSTEM AND METHOD

(75) Inventors: Stephen E. Fuks, Ann Arbor, MI (US); Michael R. Keranen, Howell, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 350 days.

(21) Appl. No.: 10/722,953

(22) Filed: Nov. 26, 2003

(65) Prior Publication Data

US 2005/0110258 A1    May 26, 2005

(51) Int. Cl.
    B60R 21/02    (2006.01)
(52) U.S. Cl. .................. 280/748; 280/751; 296/187.03
(58) Field of Classification Search ................ 280/748, 280/751–753, 730.1, 730.2, 732; 296/187.03, 296/187.05, 187.06, 70, 730.2, 732; 180/271, 180/274, 282; 188/371, 376–377
See application file for complete search history.

(56) References Cited

U.S. PATENT DOCUMENTS

| | | | | |
|---|---|---|---|---|
| 4,032,175 | A * | 6/1977 | Aibe et al. .................. | 280/751 |
| 5,533,747 | A * | 7/1996 | Rose ....................... | 280/728.2 |
| 5,536,043 | A * | 7/1996 | Lang et al. ................. | 280/753 |
| 5,775,729 | A * | 7/1998 | Schneider et al. ....... | 280/730.1 |
| 6,135,495 | A * | 10/2000 | Redgrave et al. ........... | 280/732 |
| 6,173,990 | B1 * | 1/2001 | Nakajima et al. ........ | 280/730.2 |
| 6,213,506 | B1 | 4/2001 | Swann et al. | |
| 6,305,710 | B1 * | 10/2001 | Bosgieter et al. ........... | 280/753 |
| 6,338,501 | B1 | 1/2002 | Heilig et al. | |
| 6,471,242 | B1 * | 10/2002 | Schneider ................... | 280/732 |
| 6,712,385 | B1 * | 3/2004 | Enders ..................... | 280/730.1 |
| 2002/0117835 | A1 * | 8/2002 | Schneider ................ | 280/728.2 |
| 2004/0251665 | A1 * | 12/2004 | Kumagai ................. | 280/730.1 |
| 2005/0062264 | A1 * | 3/2005 | Arwood et al. .......... | 280/730.1 |

FOREIGN PATENT DOCUMENTS

| | | |
|---|---|---|
| EP | 1 074 432 A1 | 2/2001 |
| EP | 1 104 725 A2 | 6/2001 |

OTHER PUBLICATIONS

Report to Congress: *Status on Establishing a Federal Motor Vehicle Safety Standard for Frontal Offset Crash Testing*, Apr. 1994 (pp. 1-18).

Stucki, et al., *Determination of Frontal Offset Test Conditions Based on Crash Data*, 1998, Paper No. 98-S1-O-02.

Eppinger, et al., *Supplement: Development of Improved Injury Criteria for the Assessment of Advanced Automotive Restraint Systems II*, Mar. 2000 (40 pgs.).

* cited by examiner

*Primary Examiner*—Paul N. Dickson
*Assistant Examiner*—Drew J. Brown
(74) *Attorney, Agent, or Firm*—Brinks Hofer Gilson & Lione

(57) ABSTRACT

A system for reducing the forward motion of a vehicle occupant is provided. The system includes a contact surface, a fixed energy absorption device, a deployable energy device, and an energy absorption modifier. The contact surface interacts with a vehicle occupant. The fixed energy absorption device is attached to a structural member of the vehicle. The deployable energy device is in contact with the contact surface and the fixed energy absorption device. The energy absorption modifier is in communication with the fixed energy absorption device for varying the energy absorption characteristics of the fixed energy absorption device.

13 Claims, 4 Drawing Sheets

ACTIVE KNEE BOLSTER WITH ADAPTIVE FORCE RESPONSE SYSTEM AND METHOD

TECHNICAL FIELD

The present invention relates to systems and methods for enhancing vehicle occupant protection in the event of a sudden vehicle deceleration, i.e., a vehicle accident. More particularly, the present invention relates to systems and methods for actively deploying a knee bolster.

BACKGROUND

Active knee bolsters have been developed to enhance vehicle occupant protection in the event of sudden vehicle decelerations. Active knee bolsters increase the duration of deceleration of an occupant's body and more particularly, the occupant's femurs. Further, the knee bolsters help to control a vehicle occupant's upper torso kinematics during a frontal impact event.

In operation, an impact surface of the active knee bolster is moved from a stored position to an extended position to intercept an occupant's knees, as early as possible, during a vehicle impact event. Consequently, the knees of an occupant are decelerated over a longer period of time. Thus, peak accelerations of the occupant's body, which may cause serious injury, are reduced. It is important that the knee bolster(s), in its retracted position or stored position, is compatible with vehicle styling as well as allows for easy ingress and egress of the vehicle occupants.

While known prior art active knee bolsters achieve their intended purpose, many problems still need to be addressed. For example, the differences in seat placement can affect the performance of knee bolsters. In fact, in certain seat positions, conventional active knee bolsters may not perform to a desired level and proper deployment of the active knee bolster may not take place leaving a vehicle occupant with less than optimal protection.

Current active knee bolsters and instrument panel structures closest to the driver and front passenger's knees are designed with the following crash safety objectives: 1) a controlled reaction force applied to the occupant's knees during contact with the knee bolster and 2) manage the resulting movement of the occupant, i.e., kinematics, during contact with the knee bolster. To accomplish this objective, the knee bolster is designed to crush in such a way so as to facilitate occupant ride down during the crash event. Knee bolster performance in a frontal crash is currently tailored for unbelted occupants and may be optimized for the fiftieth percentile male occupants, and thus, may not offer the same level of performance for the fifth percentile females or the ninety-fifth percentile males. The fifth percentile female occupant is smaller and lighter than the fiftieth percentile male occupant, and thus, develops much less energy in a crash event. Current knee bolsters systems are designed to provide favorable energy absorption, i.e., reaction, forces for the fiftieth percentile male occupants. But these systems may provide a static stiffness that is often too large to crush for the fifth percentile female occupant, thus providing a less than optimal reaction force for the lighter and smaller occupants.

Therefore, a new and improved system and method for enhancing occupant protection using an active knee bolster is needed. The new and improved knee bolster should be compatible with vehicle interior designs as well as not inhibit vehicle ingress and egress. Further, the performance of the actual knee bolster should not degrade with changes in seat position.

SUMMARY

In an aspect of the present invention, a customizable active knee bolster system is provided. The knee bolster system provides a reaction (energy absorption) force that can be modified based on the occupant's physical characteristics and location within the vehicle passenger compartment. Sensors already required in vehicles to meet Federal Motor Vehicle Safety Standards (i.e. FMVSS208) to detect front seat fifth percentile female occupants and/or airbag and seat belt control provide the necessary control inputs to determine the level of stiffness of the active knee bolster(s) needed by the occupant.

The physical structure of the knee bolster, in an embodiment of the present invention, may be modified by means of a pyrotechnic device, for example, to shear off the top of a bolt or pin to detach an element from the knee bolster structure.

In another embodiment of the present invention, dynamic performance of the knee bolster is changed by incorporating multiple structural elements that may be detached from the knee bolster structure during a vehicle impact to customize the knee bolster response characteristics.

In yet another embodiment of the present invention, a knee bolster system that provides one level of energy absorption force for a fiftieth percentile male occupant and another (lower) energy absorption force for a fifth percentile female occupant is provided.

In still another embodiment of the present invention, a bracket structure is provided with a stiffening strap near the top end of the bracket structure which provides additional stiffness for a fiftieth percentile male in a crash.

In yet another embodiment of the present invention, the stiffness strap is removed, for example, by a pyrotechnic device during a crash involving a fifth percentile female. Thus, a less stiff, easier to crush bracket structure for the fifth percentile female occupant is provided.

In still another embodiment of the present invention, sensors such as seat weight sensors and seat position sensors are utilized to determine the stiffness level necessary of the active knee bolster for that particular occupant physical characteristics and location.

These and other aspects and advantages of the present invention will become apparent upon reading the following detailed description of the invention in combination with the accompanying drawings.

DETAILED DESCRIPTION OF THE INVENTION

Figure 1:
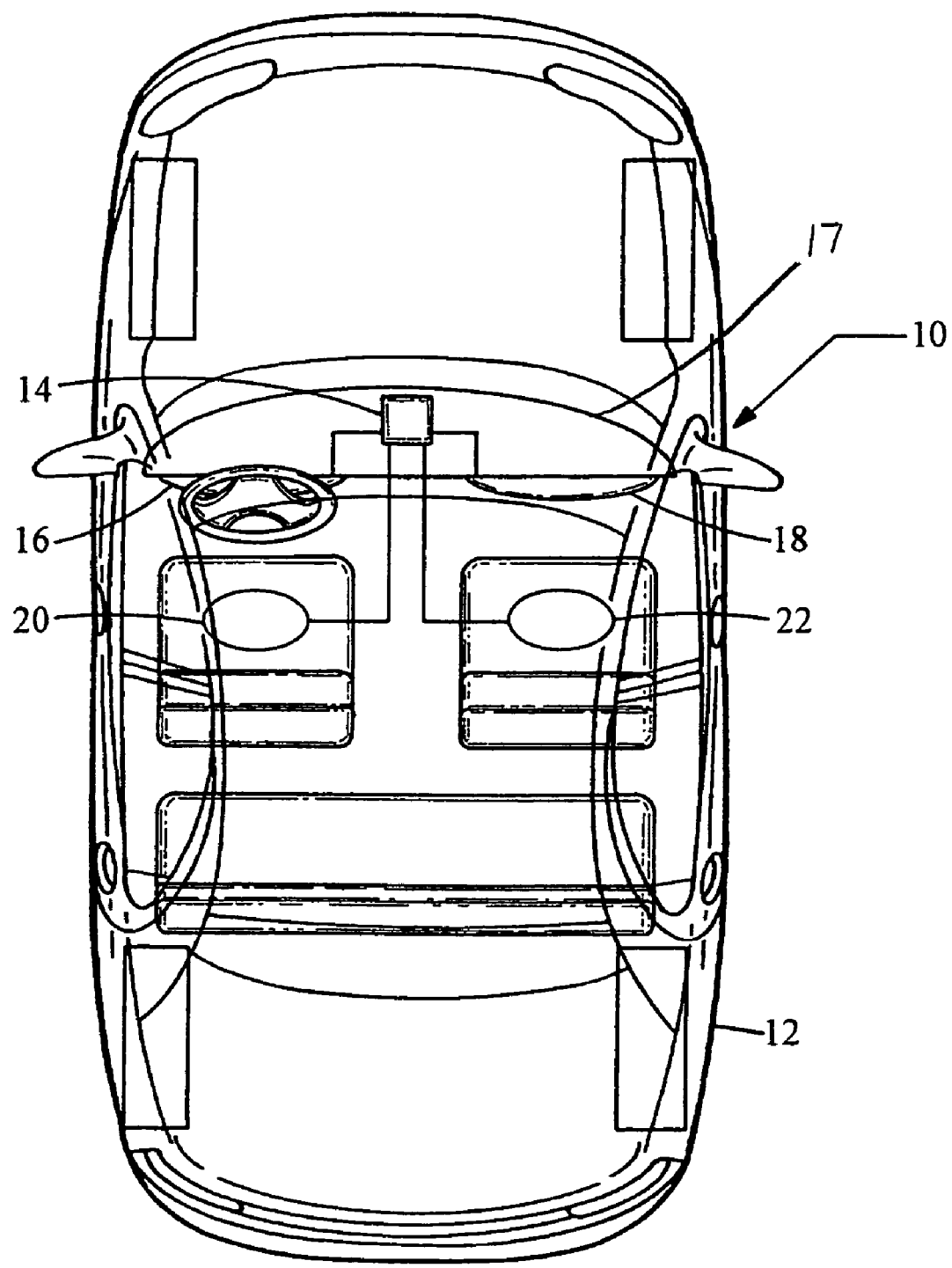
FIG. 1 is a diagrammatic view of an occupant injury protection system mounted in vehicle, in accordance with the present invention.

Referring now to FIG. 1, an occupant protection system 10 is illustrated mounted in vehicle 12, in accordance with an embodiment of the present invention. Occupant protection system 10 includes an occupant protection control module 14 packaged in an instrument panel 17. Control module 14 is in communication with an active knee bolster 16 mounted on the driver's side of the vehicle and an active knee bolster 18, of similar construction, mounted in instrument panel 17 on the passenger side of vehicle 12. Further, an occupant detection sensor 20 disposed on the driver's side of the vehicle is electrically connected to control module 14 and an occupant detection sensor 22 is disposed on the passenger's side of vehicle 12 and is electrically connected to control module 14. Occupant detection sensors 20, 22 are configured to detect an occupant's physical characteristics, such as size and weight and also the relative position of the occupant with respect to active knee bolsters 16, 18.

Figure 2:
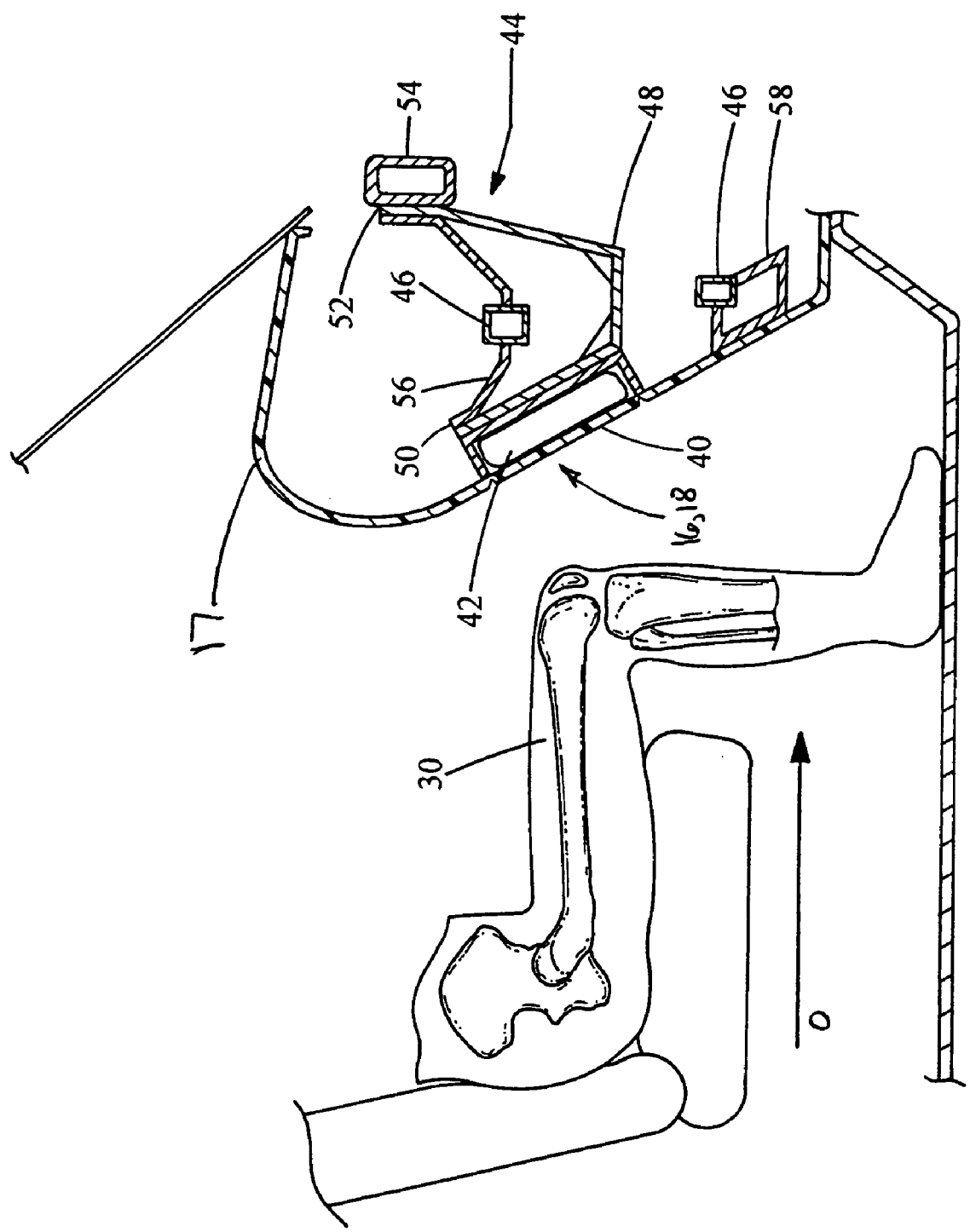
FIG. 2 is a schematic cross-sectional view through a device, prior to impact with a vehicle occupant, for use in the occupant protection system to enhance vehicle injury protection, in accordance with the present invention.
Figure 3:
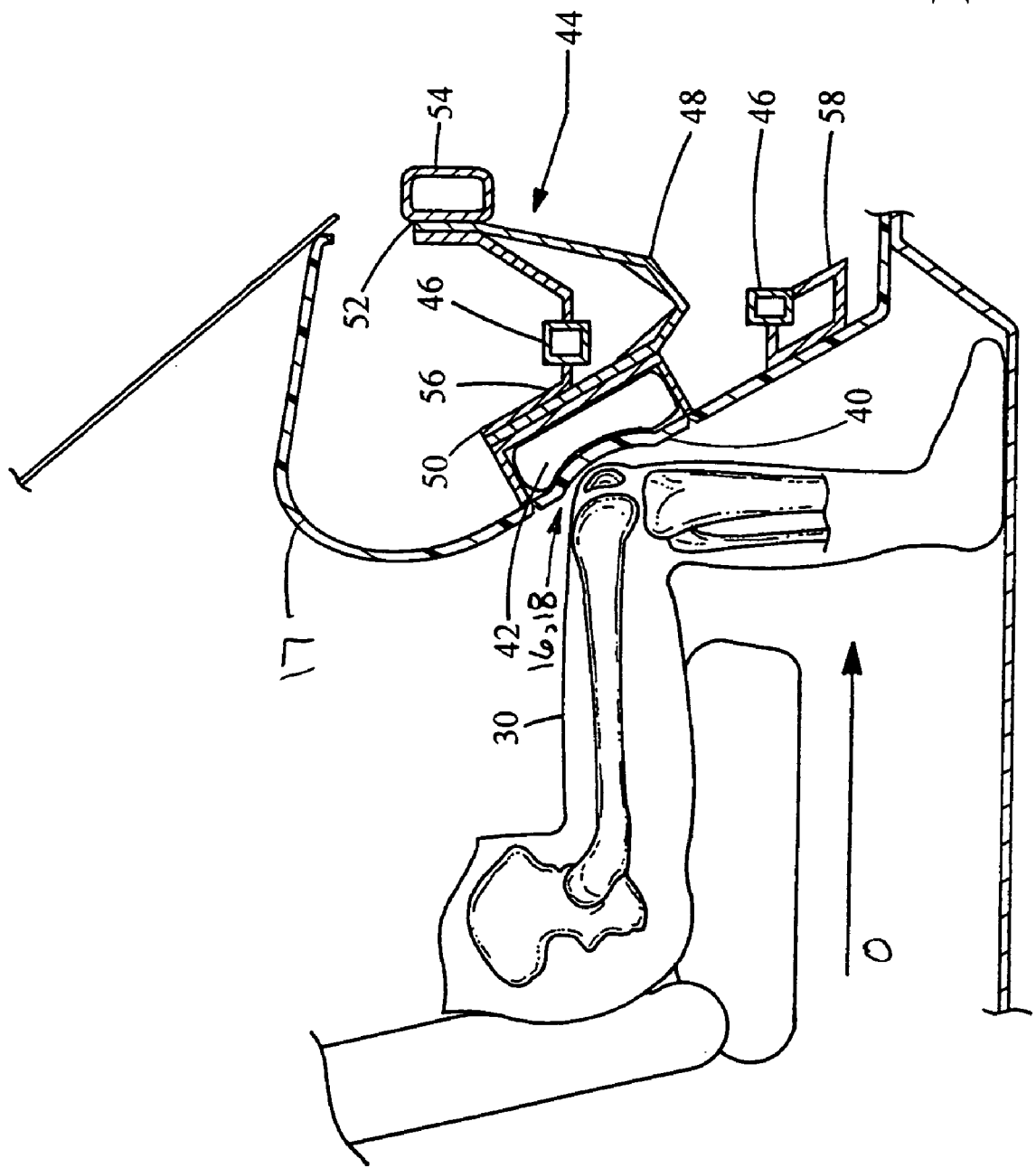
FIG. 3 is a schematic cross-sectional view through a device, subsequent to impact with a vehicle occupant, for use in the occupant protection system to enhance vehicle injury protection, in accordance with the present invention.
Figure 4:
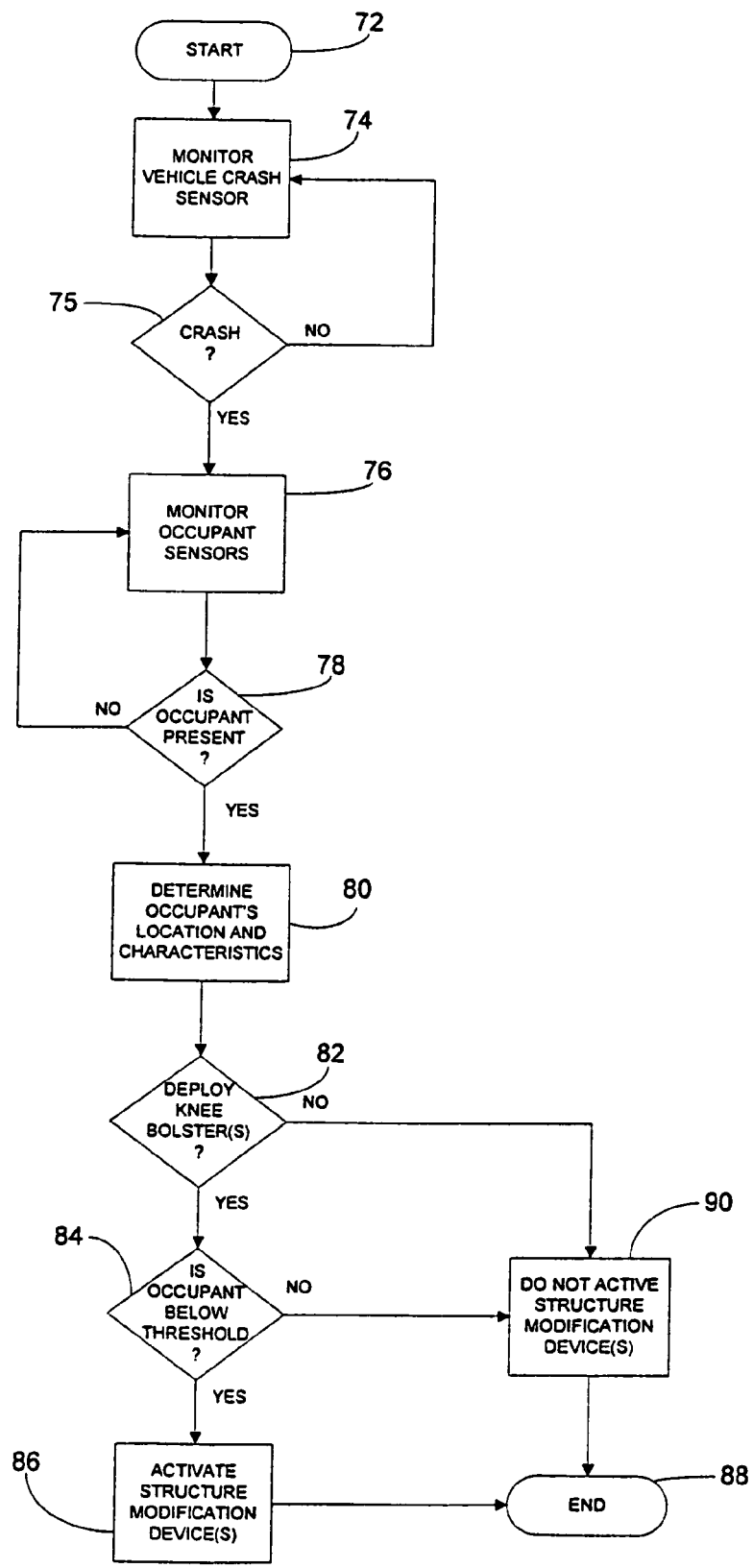
FIG. 4 is a flow diagram of a method for controlling the occupant protection system to enhance vehicle injury protection, in accordance with the present invention.

Control module 14 includes control logic that may be implemented either in software or hardware for controlling the operation of occupant protection system 10. Active knee bolsters 16 and 18, the construction of which will be described in further detail below, are positioned in front of the knees of an occupant 30 (as shown in FIGS. 2 and 3) and engage the occupant during a vehicle crash. Knee bolsters 16, 18 operate to increase the length of time over which vehicle occupant 30 is brought to rest during a vehicle crash event. By slowly decelerating vehicle occupant 30 over a greater length of time, a significant reduction in occupant injuries by reducing peak accelerations/loads on the occupant's knees may be achieved.

Occupant detection sensors 20 and 22 that are in communication with control module 14 may be for example, occupant weight sensors, vehicle seat position sensors, or seat belt detection sensors, or a combination of those types of sensors.

With continuing reference to FIGS. 2 and 3, cross-sectional views through instrument panel 17 at either knee bolster 16, 18, are illustrated in accordance with an embodiment of the present invention. FIG. 2 illustrates the structural condition of the active knee bolster(s) prior to impact by a vehicle occupant and FIG. 3 illustrates the change in the structure of the knee bolsters after an occupant impacts the knee bolster(s). Active knee bolsters 16 and 18 would be configured in a similar manner as herein described, except for the differences required due to the different interior surfaces and styling of the mounting locations in the vehicle, i.e., driver's side or passenger's side. Active knee bolsters 16 and 18 include a reaction surface 40 that interacts with the knees of occupant 30, a deployable energy absorption system 42, a deformable structure 44, and a structure modification device 46.

Deployable energy absorption system 42, in an embodiment of the present invention, is an air inflation device such as an airbag, however, may also include a mechanical deployable knee bolster device, as known in the art. In either case, surface 40 of the knee bolster 16, 18 is deployed toward the moving occupant in a direction opposite of arrow O. As shown, deployable energy absorption system 42 is disposed between reaction surface 40 and deformable structure 44.

In an embodiment of the present invention, deformable structure 44 includes a generally U-shaped bracket 48. Bracket 48 is connected at a first end 50 to deployable energy absorption system 42 and at a second end 52 to a cross-car beam structure 54 of vehicle 12. Cross-car beam structure 54, as well known in the art, is a structural member of vehicle 12 that spans the passenger compartment and provides structural support for instrument panel 17. Deformable structure 44 includes an auxiliary stiffening member or strap 56 positioned between deployable energy absorption system 42 and a cross-car beam structure 54. Auxiliary stiffening member 56 increases the stiffness of deformable structure 44 in the direction of occupant travel as indicated by arrow). Connected to auxiliary stiffening member 56 is structure modification device 46, as will be described in further detail below.

While FIG. 2 shows structure modification device 46 attached to auxiliary stiffening member 56, the present invention contemplates other attachments and locations of modification device 46 to reduce the stiffness of deformable structure 44. For example, structure modification device 46 may also be applied to a lower structural portion 58 of instrument panel 17. Moreover, various structural elements of deformable structure 44 may be engaged or disengaged to provide lower or higher reaction forces on a vehicle occupant and as well as control an occupant's kinematics during frontal impact crashes. The stiffness of structure 44, especially, in the case where the deployable energy absorption system is inhibited, i.e. can't be deployed due to the close proximity of the occupant's knees is modifiable to achieve the desired occupant protective level.

Structure modification device 46, in an embodiment of the present invention may be a pyrotechnic device that severs a bolt securing two halves of auxiliary stiffening member 56. Alternatively, device 46 may operate to completely shear any structural component of deformable structure 44 including auxiliary stiffening member 56 to change the stiffness characteristics of structure 44.

In operation, as depicted in FIG. 3, a control method for controlling occupant protection system 10 is illustrated, in accordance with an embodiment of the present invention. Method 70 is initiated at block 72. At block 74, the system monitors a vehicle crash sensor. The vehicle crash sensor is any conventional crash sensing device such as an accelerometer based device or the like. If at block 75, the system determines that a frontal impact is occurring or will occur, the system monitors the occupant sensors at block 76. If however, a vehicle impact has not been sensed, then the system returns to block 72. As represented by block 78, the presence of an occupant is determined 78. If, at block 78, the system determines that no occupants are present, then the system returns to block 76. If at block 78 the system determines that an occupant is present, then at block 80 the system determines the occupant's location within the passenger compartment of the vehicle and/or physical characteristics (i.e., size, weight, height, etc.). Based on this information, at block 82 the system determines whether to deploy the active knee bolsters. If the system determines that the active knee bolsters are to be deployed, then at block 84 the system determines whether the occupant is above or below a predefined threshold based on the measured physical characteristics of the occupant. The predefined occupant threshold may be, for instance, whether the occupant has the physical characteristics that are equal to or greater than that of a 50 percentile male occupant. In other words, if the occupant's weight and size and location whether the passenger compartment indicates that the occupant has the characteristics of a fifth percentile female, then the system would determine that the occupant is below the predefined threshold. On the other hand, if the occupant's characteristics as well as location within the passenger compartment is consistent with that of a 95th percentile male for example, then the system would determine that the occupant is above the predefined threshold. Of course, the present invention contemplates multiple thresholds to compare the physical characteristics and location of a vehicle occupant.

Accordingly, if at block 82, the system determines that the knee bolster should not be deployed and, at block 84, that the occupant is below a predefined threshold, the structure modification device is activated, as represented by block 86. Thereafter, method 70 terminates at block 88.

However, if at block 82 the system determines that the knee bolster should be deployed and at block 84 that the occupant is not below a predefined threshold then, as represented at block 90, the structural modification device is not activated and a system terminates at block 88.

Thus, as readily apparent from the above description and illustrations in FIGS. 1–3, the stiffness of occupant protection system 10 may be modified based on a vehicle occupants physical characteristics as well as the occupant's location within the passenger compartment of a vehicle. For example, if the vehicle occupant has the physical characteristics of a fifth percentile female, the occupant protection system will vary the stiffness of the structure of the active knee bolsters to provide a softer structure (less stiff) by activating the structure modification device 46. Alternatively, if the occupant protection system determines that the vehicle occupant has the physical characteristics of a 50th percentile male or a 95th percentile male, the system may or may not deploy the knee bolster and may or may not activate the structure modification device 46 thereby altering the stiffness of the knee bolster 16, 18.

As any person skilled in the art of systems and methods for enhancing vehicle occupant protection in the event of a vehicle accident and systems and methods for actively deploying a knee bolster will recognize from the previous detailed description and from the figures, modifications and changes can be made to the preferred embodiments of the invention.

The invention claimed is:

1. A system for contacting a vehicle occupant during sudden deceleration of the vehicle, the system comprising:
   a contact surface for interacting with the vehicle occupant;
   a fixed energy absorption device attached to a structural member of the vehicle;
   a deployable energy absorption device in contact with the contact surface and the fixed energy absorption device; and
   an energy absorption modifier in communication with the fixed energy absorption device for varying the energy absorption characteristics of the fixed energy absorption device, the energy absorption modifier being a pyrotechnic bolt that disconnects the fixed energy absorption device from the structural member of the vehicle.

2. The system of claim 1 wherein the contact surface includes a deformable foam layer.

3. The system of claim 1 wherein the fixed energy absorption device is a deformable metal bracket.

4. The system of claim 3 wherein the deformable metal bracket is a U-shaped bracket.

5. The system of claim 1 wherein the deployable energy absorption device is an inflatable airbag.

6. The system of claim 1 wherein the energy absorption modifier is a pyrotechnic device.

7. The system of claim 1 further comprising a frangible structural member connected at a first end to the contact surface and at a second end to the structural member of the vehicle.

8. A system for contacting a vehicle occupant during sudden deceleration of the vehicle, the system comprising:
   a contact surface for interacting with a vehicle occupant;
   a fixed energy absorption device attached to a structural member of the vehicle;
   a frangible structural member connected at a first end to the contact surface and at a second end to the structural member of the vehicle;
   a deployable energy absorption device in contact with the contact surface and the fixed energy absorption device; and
   an energy absorption modifier in communication with the frangible structural member for varying the energy absorption characteristics of the frangible structural member, the energy absorption modifier being a pyrotechnic bolt that disconnects the fixed energy absorption device from the structural member of the vehicle.

9. The system of claim 8 wherein contact surface includes a deformable foam layer.

10. The system of claim 8 wherein the fixed energy absorption device is a deformable metal bracket.

11. The system of claim 10 wherein the deformable metal bracket is a U-shaped bracket.

12. The system of claim 8 wherein the deployable energy absorption device is an inflatable airbag.

13. The system of claim 8 wherein the energy absorption modifier is a pyrotechnic device.

* * * * *